US010894471B2

(12) United States Patent
Yokoyama et al.

(10) Patent No.: US 10,894,471 B2
(45) Date of Patent: Jan. 19, 2021

(54) MOUNTING STRUCTURE FOR POWER CONVERSION DEVICE

(71) Applicant: NISSAN MOTOR CO., LTD., Yokohama (JP)

(72) Inventors: Nobuaki Yokoyama, Kanagawa (JP); Mikio Nozaki, Kanagawa (JP); Hiroki Wada, Kanagawa (JP); Takahiro Kurosawa, Kanagawa (JP); Takeshi Hamamoto, Kanagawa (JP); Anna Hayashi, Kanagawa (JP); Tomoya Kamada, Kanagawa (JP); Takashi Yoshikawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/303,804

(22) PCT Filed: May 25, 2016

(86) PCT No.: PCT/JP2016/065433

§ 371 (c)(1),
(2) Date: Nov. 21, 2018

(87) PCT Pub. No.: WO2017/203621

PCT Pub. Date: Nov. 30, 2017

(65) Prior Publication Data

US 2019/0337374 A1 Nov. 7, 2019

(51) Int. Cl.

*B60K 1/00* (2006.01)
*B60K 5/12* (2006.01)

(Continued)

(52) U.S. Cl.

CPC .............. *B60K 5/1208* (2013.01); *B60K 1/00* (2013.01); *B60K 5/04* (2013.01); *B60R 16/04* (2013.01);

(Continued)

(58) Field of Classification Search

CPC .......... B60K 5/1208; B60K 1/00; B60K 6/40; B60R 16/04

See application file for complete search history.

(56) References Cited

U.S. PATENT DOCUMENTS

| | | | | |
|---|---|---|---|---|
| 5,636,701 A * | 6/1997 | Norman | B60R 16/04 | 180/68.5 |
| 6,371,229 B1 | 4/2002 | Kakiuchi | | |

(Continued)

FOREIGN PATENT DOCUMENTS

| | | |
|---|---|---|
| JP | 2000-255282 A | 9/2000 |
| JP | 2005-168158 A | 6/2005 |

(Continued)

*Primary Examiner* — Emma K Frick

(74) *Attorney, Agent, or Firm* — Foley & Lardner LLP

(57) ABSTRACT

A mounting structure for a power conversion device includes: a vehicle body component extending in a front-rear direction of a vehicle; a mounting component provided on the vehicle body component; a drive unit held by the vehicle body component via the mounting component; and a power conversion device attached to the mounting component. A stiffness of the mounting component is greater than a stiffness of the vehicle body component. The power conversion device is arranged between a front end and a rear end of the drive unit in a side view of the vehicle.

13 Claims, 7 Drawing Sheets

49(7)
9
87
85
23
5
3
3
21
27
25
RH
LH
51(7)

(51) Int. Cl.

| | |
|---|---|
| ***B60K 5/04*** | (2006.01) |
| ***B60R 16/04*** | (2006.01) |
| *B60K 6/40* | (2007.10) |

(52) U.S. Cl.

CPC ............. *B60K 6/40* (2013.01); *B60Y 2200/91* (2013.01); *B60Y 2200/92* (2013.01)

(56) References Cited

U.S. PATENT DOCUMENTS

| | | | | |
|---|---|---|---|---|
| 7,874,395 | B2 * | 1/2011 | Taji | B60K 1/00 180/295 |
| 8,336,657 | B2 * | 12/2012 | Dobbins | B60R 25/00 180/68.5 |
| 8,616,319 | B2 * | 12/2013 | Yokoyama | B60K 1/04 180/68.5 |
| 8,820,452 | B2 * | 9/2014 | Iwasa | B60K 1/04 180/68.2 |
| 8,851,223 | B2 * | 10/2014 | Yamashita | B62D 21/155 180/291 |
| 9,010,479 | B2 * | 4/2015 | Kambayashi | B60H 1/3223 180/291 |
| 9,203,233 | B2 * | 12/2015 | Kitami | B60L 3/04 |
| 9,409,495 | B2 | 8/2016 | Kobayashi | |
| 9,718,362 | B2 * | 8/2017 | Yamanaka | B60K 1/00 |
| 10,358,024 | B2 * | 7/2019 | Yugami | |
| 2005/0205316 | A1 * | 9/2005 | Yamafuji | B60L 3/0007 180/68.5 |
| 2013/0270862 | A1 | 10/2013 | Hotta et al. | |
| 2015/0258913 | A1 | 9/2015 | Kobayashi | |

FOREIGN PATENT DOCUMENTS

| | | | |
|---|---|---|---|
| JP | 2012-144227 | A | 8/2012 |
| JP | 2012-166653 | A | 9/2012 |
| JP | 5880724 | B2 | 3/2016 |

* cited by examiner

MOUNTING STRUCTURE FOR POWER CONVERSION DEVICE

TECHNICAL FIELD

The present invention relates to a mounting structure for a power conversion device.

BACKGROUND ART

A structure in which a drive compartment is arranged in a front portion of a vehicle and drive sources such as an engine and a motor are housed inside the drive compartment has been publicly known (see Patent Literature 1). In Patent Literature 1, a motor room is arranged in a front portion of a vehicle and a motor case and a power control unit case are arranged inside the motor room. Specifically, the power control unit case is fixed onto an upper surface of the motor case.

CITATION LIST

Patent Literature

Patent Literature 1: Japanese Patent Application Publication No. 2012-144227

SUMMARY OF INVENTION

Technical Problem

The motor case described in Patent Literature 1 is arranged to be tilted downward toward the lower front side in a side view from the side of the vehicle. Accordingly, in frontal collision of the vehicle, there is a risk that a front end of the motor case rotates and moves downward and load inputted into the power control unit case increases.

In view of this, an object of the present invention is to provide a mounting structure for a power conversion device which can reduce load inputted into the power conversion device in frontal collision of a vehicle.

Solution to Problem

A mounting structure for a power conversion device according to the present invention includes: a mounting component provided on a vehicle body component; and a drive unit and a power conversion device which are attached to the mounting component. The power conversion device is arranged between a front end and a rear end of the drive unit in a side view of a vehicle.

Advantageous Effects of Invention

The mounting structure for a power conversion device according to the present invention can reduce impact load inputted into the power conversion device.

DESCRIPTION OF EMBODIMENTS

Figure 1:
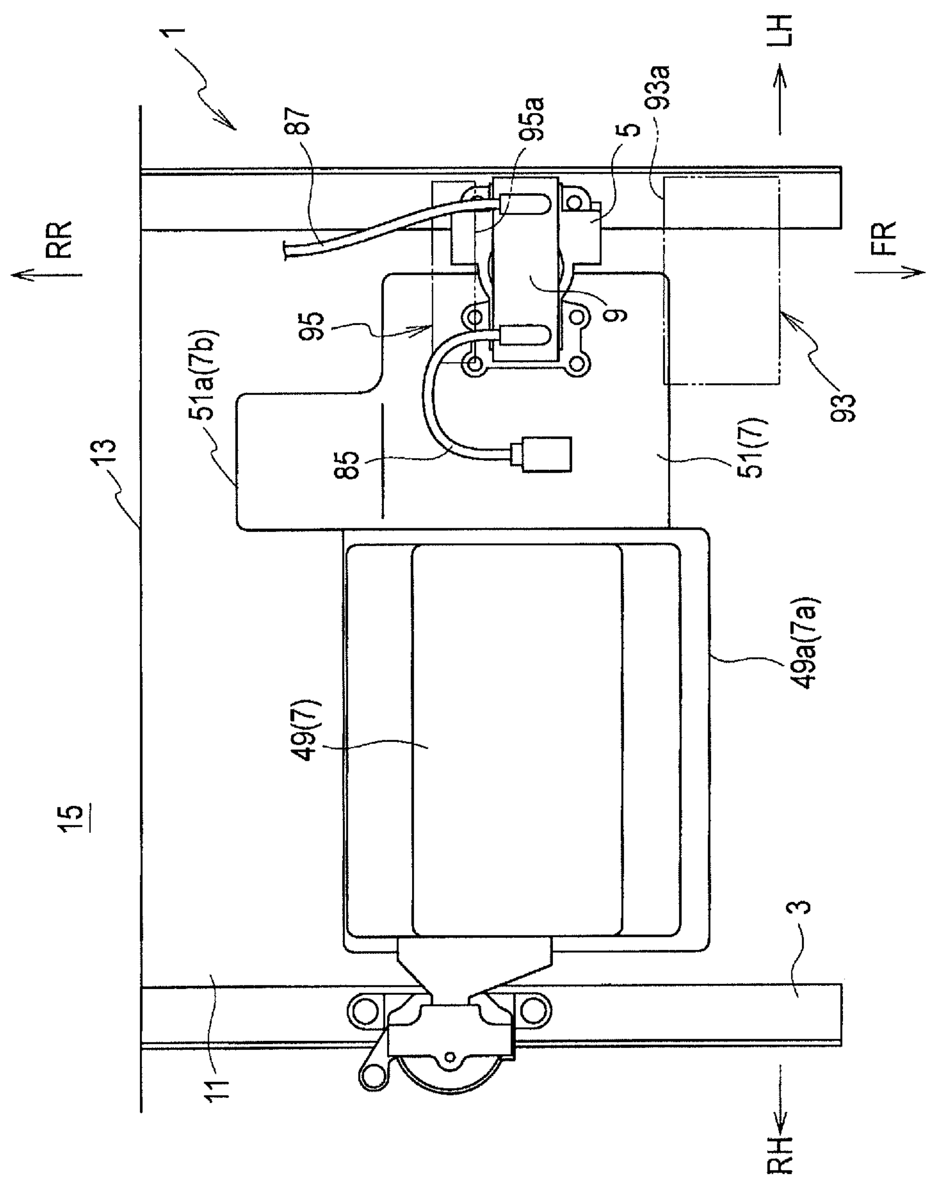
FIG. 1 is a plan view of a vehicle front portion provided with a mounting structure for a power conversion device according to an embodiment of the present invention, as viewed from above.
Figure 2:
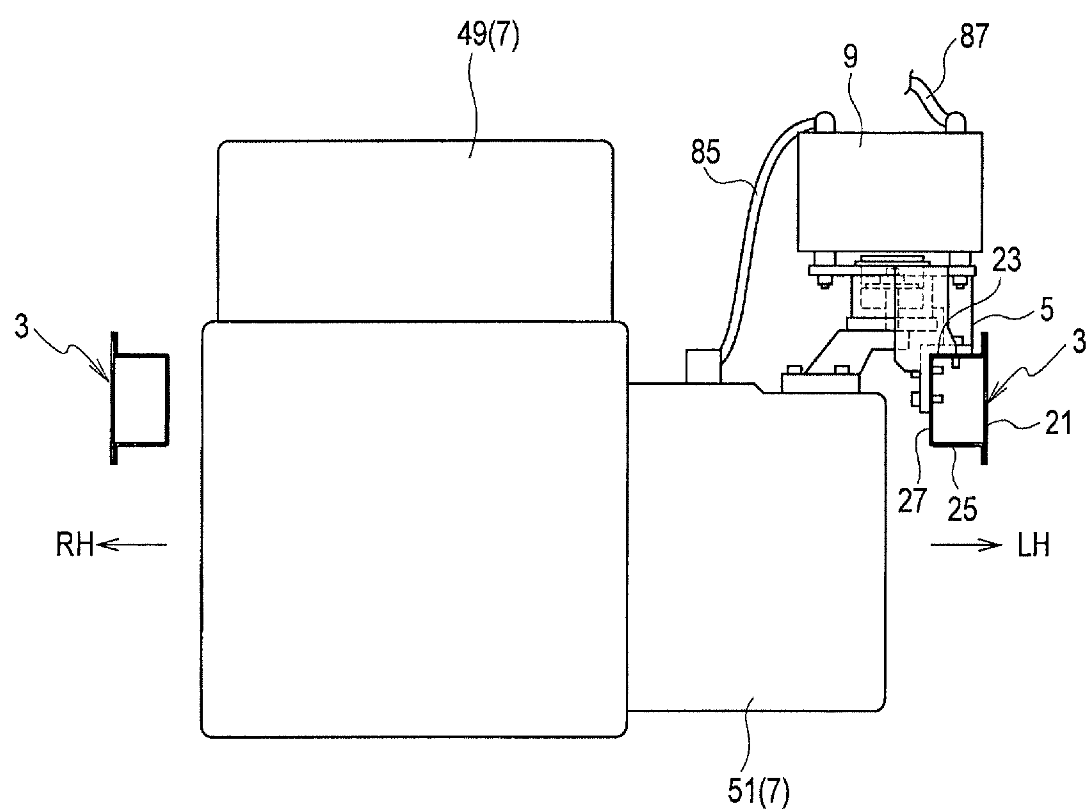
FIG. 2 is a front view of the vehicle front portion in FIG. 1 as viewed from a vehicle front side.

An embodiment of the present invention is described below. Note that, in the drawings, FR denotes a vehicle front side; RR, a rear side; RH, a vehicle right side; and LH, a vehicle left side.

As illustrated in FIGS. 1 to 5, in a vehicle front portion 1, there are arranged a pair of left and right side members 3 (vehicle body components) extending in a front-rear direction of a vehicle, mounting components 5 provided on the respective side members 3, a drive unit 7 held by the side members 3 via the mounting components 5, and an inverter 9 (power conversion device) attached to one of the mounting components 5. As illustrated in FIG. 1, the side members 3, the mounting components 5, the drive unit 7, and the inverter 9 are arranged inside a drive compartment 11 in the vehicle front portion 1. A vehicle cabin 15 is arranged on the vehicle rear side of the drive compartment 11 with a dash panel 13 provided therebetween. In other words, the vehicle front side of the dash panel 13 is configured to be the drive compartment 11 and the vehicle rear side of the dash panel 13 is configured to be the vehicle cabin 15.

Each side member 3 (vehicle body component) is formed in a square tube shape to extend in the front-rear direction. Specifically, the side member 3 is configured to have a closed cross-sectional structure including an outer surface 21 on the outer side in a vehicle width direction, an upper surface 23 extending from an upper portion of the outer surface 21 toward the center in the vehicle width direction, a lower surface 25 extending from a lower portion of the outer surface 21 toward the center in the vehicle width direction, and an inner surface 27 connecting the upper surface 23 and the lower surface 25 to each other.

FIGS. 4 to 7 illustrate a portion around the side member 3 on the vehicle left side. As illustrated in detail in FIGS. 4 to 7, the mounting component 5 includes a lower bracket 31 arranged in a lower portion and an upper bracket 33 arranged in an upper portion which are integral with each other. The lower bracket 31 is bent in an L shape as viewed from the vehicle front side. Specifically, the lower bracket 31 includes a vertical wall 35 extending in the front-rear direction and an up-down direction and an upper wall 37 bent from an upper end of the vertical wall 35 and extending outward in the vehicle width direction, the walls 35, 37 formed integrally with each other. The upper bracket 33 includes three supporting legs 39 extending upward from the upper wall 37 of the lower bracket 31 and an upper surface portion 41 arranged on the supporting legs 39, the supporting legs 39 and the upper surface portion 41 being integral with one another. The upper surface portion 41 is provided with an outer extended portion 43 formed in an end on the vehicle left side and an inner extended portion 45 formed in an end on the vehicle right side. Bolt holes 46 are formed in the outer extended portion 43 and the inner extended portion 45. Moreover, a cylindrical rubber piece housing 47 is provided in a center of the upper surface portion 41 to protrude downward. Furthermore, as illustrated in detail in FIGS. 5 and 6, the upper wall 37 of the lower bracket 31 is placed on the upper surface 23 of the side member 3, the vertical wall 35 of the lower bracket 31 is in contact with the inner surface 27 of the side member 3, and the lower bracket 31 is fastened to the side member 3 by using nuts N and bolts B.

The drive unit 7 includes an engine 49 arranged on the vehicle right side and an electric motor 51 arranged on the vehicle left side of the engine 49 which are integral with each other. The engine 49 and the electric motor 51 are heavy objects with larger weights than other general vehicle components such as a battery and an air cleaner. In the electric motor 51 for driving the vehicle, a three-phase synchronous motor is used. A power semiconductor device of the inverter 9 converts a direct current, supplied from a not-illustrated high-voltage driving battery via a junction box, to a three-phase alternating current and supplies the three-phase alternating current to the electric motor 51 such as the synchronous motor. The three-phase alternating current supplied to the electric motor 51 is generated as follows: a current corresponding to a target torque with a frequency synchronous with the number of revolutions is generated by switching performed by semiconductor switching means based on a PWM signal. A control device performs PWM output to a semiconductor device of the switching means, in synchronization with the number of revolutions, according to the target torque and performs feedback control such that a value of a current sensor detecting a phase current matches the target.

Figure 6:
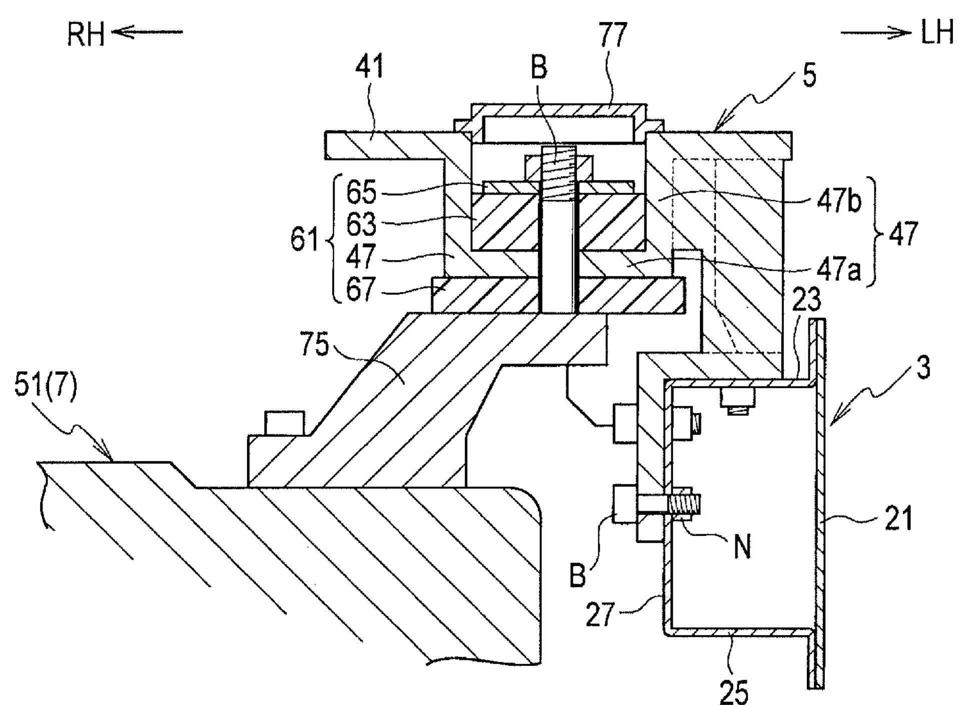
FIG. 6 is a cross-sectional view along the line A-A of FIG. 4.
Figure 7:
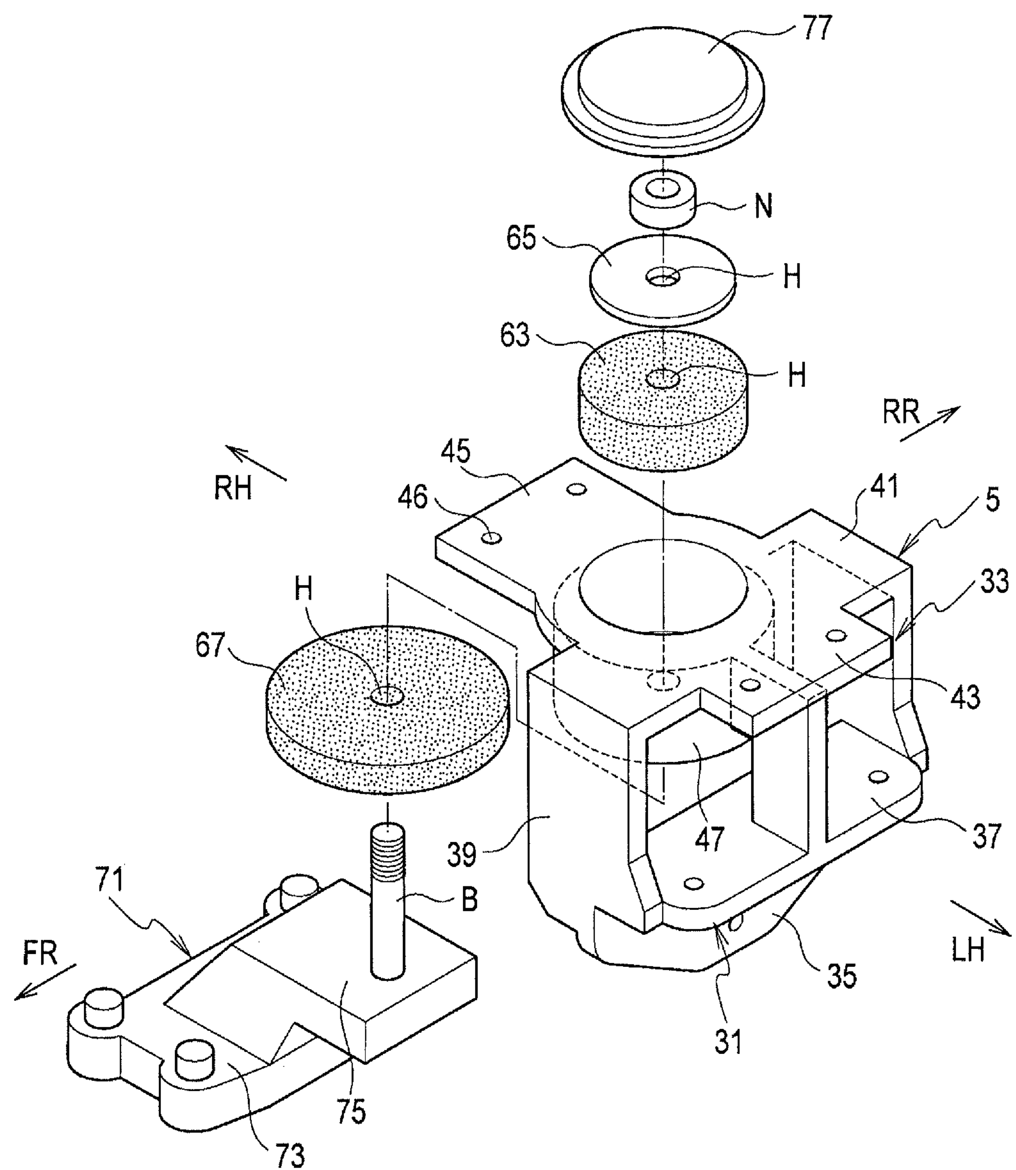
FIG. 7 is an exploded perspective view of a mounting component according to the embodiment of the present invention.

The mounting component 5 includes a vibration damper 61 supporting the drive unit 7. The details of the vibration damper 61 are described below. As illustrated in FIGS. 6 and 7, the vibration damper 61 includes the rubber piece housing 47 provided in the mounting component 5, an upper rubber piece 63 housed inside the rubber piece housing 47, a metal holding plate 65 arranged on the upper rubber piece 63, and a lower rubber piece 67 arranged below a bottom surface **47*a* of the rubber piece housing 47. The rubber piece housing 47 includes the disc-shaped bottom surface 47*a* and a cylindrical side surface 47*b* extending upward from an outer peripheral edge of the bottom surface 47*a*. The upper rubber piece 63, the metal holding plate 65, the bottom surface 47*a* of the rubber piece housing 47, and the lower rubber piece 67 are formed in disc shapes and an insertion hole H for inserting a bolt B is formed in a radial center of each of these members. Note that the upper rubber piece 63 and the lower rubber piece 67 are not limited to particular pieces as long as they are normal elastic rubber pieces. The mounting component 5 and the side member 3 are made of electrically-conductive metal. Moreover, the stiffness of the mounting component 5 is set to be greater than the stiffness of the side member 3**.

A holding body 71 is fixed onto an upper surface 69 of the electric motor 51. The holding body 71 includes a base 73 placed on the upper surface 69 of the electric motor 51, a holding leg 75 extending upward from an upper surface of the base 73, and the bolt B extending upward from an upper surface of the holding leg 75, the base 73, the holding leg 75, and the bolt B formed integrally with one another. The bolt B is inserted into the insertion holes H of the upper rubber piece 63, the metal holding plate 6 65, the bottom surface **47*a* of the rubber piece housing 47, and the lower rubber piece 67, and a front end of the bolt B protrudes from the insertion hole H of the metal holding plate 65. A nut N is screwed to the front end of the bolt B and the holding body 71 can be thereby coupled to the vibration damper 61. The drive unit 7 is thereby held by the side member 3 via the mounting component 5. Note that an upper opening of the rubber piece housing 47 is sealed by a sealing plate 77**.

The inverter 9 (power conversion device) is attached to the mounting component 5.

Protrusions 81 protrude downward in left and right ends of a lower surface of the inverter 9 and four bolts B extending downward from bottom surfaces of the protrusions 81 are provided. Moreover, a first wire 85 and a second wire 87 are connected to an upper surface 83 of the inverter 9. A terminal 89 is provided at a front end of the first wire 85 and is connected to a connector 91 of the electric motor 51. The electric motor 51 and the inverter 9 are thus electrically connected to each other via the first wire 85. The second wire 87 is connected to the not-illustrated high-voltage battery. An entire outer surface of the inverter 9 is made of electrically-conductive metal. Note that the inverter 9 performs DC to AC conversion of high-voltage high-current power by performing high-speed switching. Accordingly, the inverter 9 is a generation source of electrical noise. Moreover, the inverter 9 is preferably arranged near the electric motor 51. Due to such reasons, the inverter 9 is arranged inside the drive compartment 11.

As described above, total of four bolt holes 46 are formed in the upper surface portion 41 of the upper bracket 33 forming the mounting component 5. The inverter 9 is attached to the mounting component 5 by inserting the bolts B of the protrusions 81 of the inverter 9 into the bolt holes 46 in the upper surface portion 41 of the upper bracket 33 and screwing nuts N to the bolts B. As described above, the side member 3, the mounting component 5, and the outer surface of the inverter 9 are made of metal, the 7 side member 3 and the mounting component 5 are in contact with each other, and the mounting component 5 and the outer surface of the inverter 9 are in contact with each other.

Figure 3:
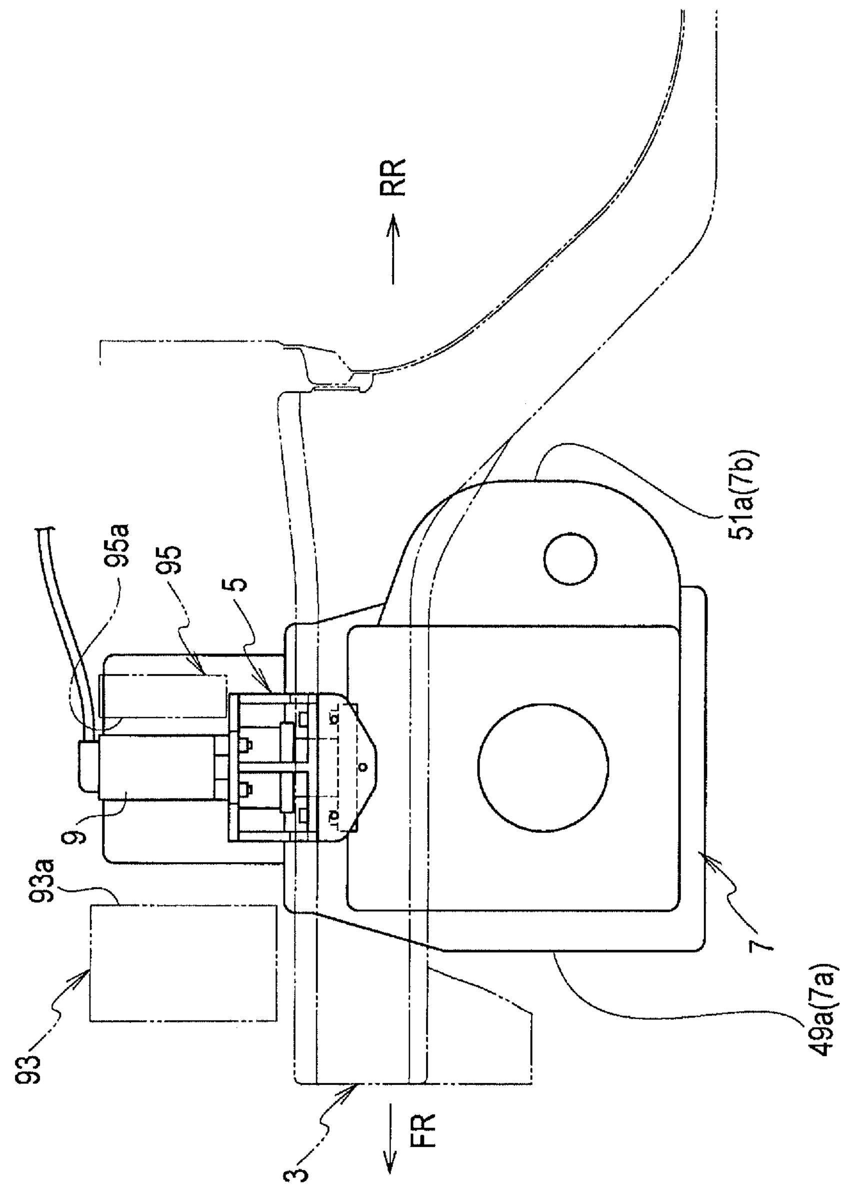
FIG. 3 is a side view of the vehicle front portion in FIG. 2 as viewed from a vehicle left side.

Moreover, as illustrated in FIGS. 1 and 3, the inverter 9 is arranged between a front end **7*a* and a rear end 7*b* of the drive unit 7 as viewed from the side of the vehicle. Specifically, the front end 7*a* of the drive unit 7 is a front surface 49*a* of the engine 49 and the rear end 7*b* of the drive unit 7 is a rear surface 51*a* of the electric motor 51**.

Figure 4:
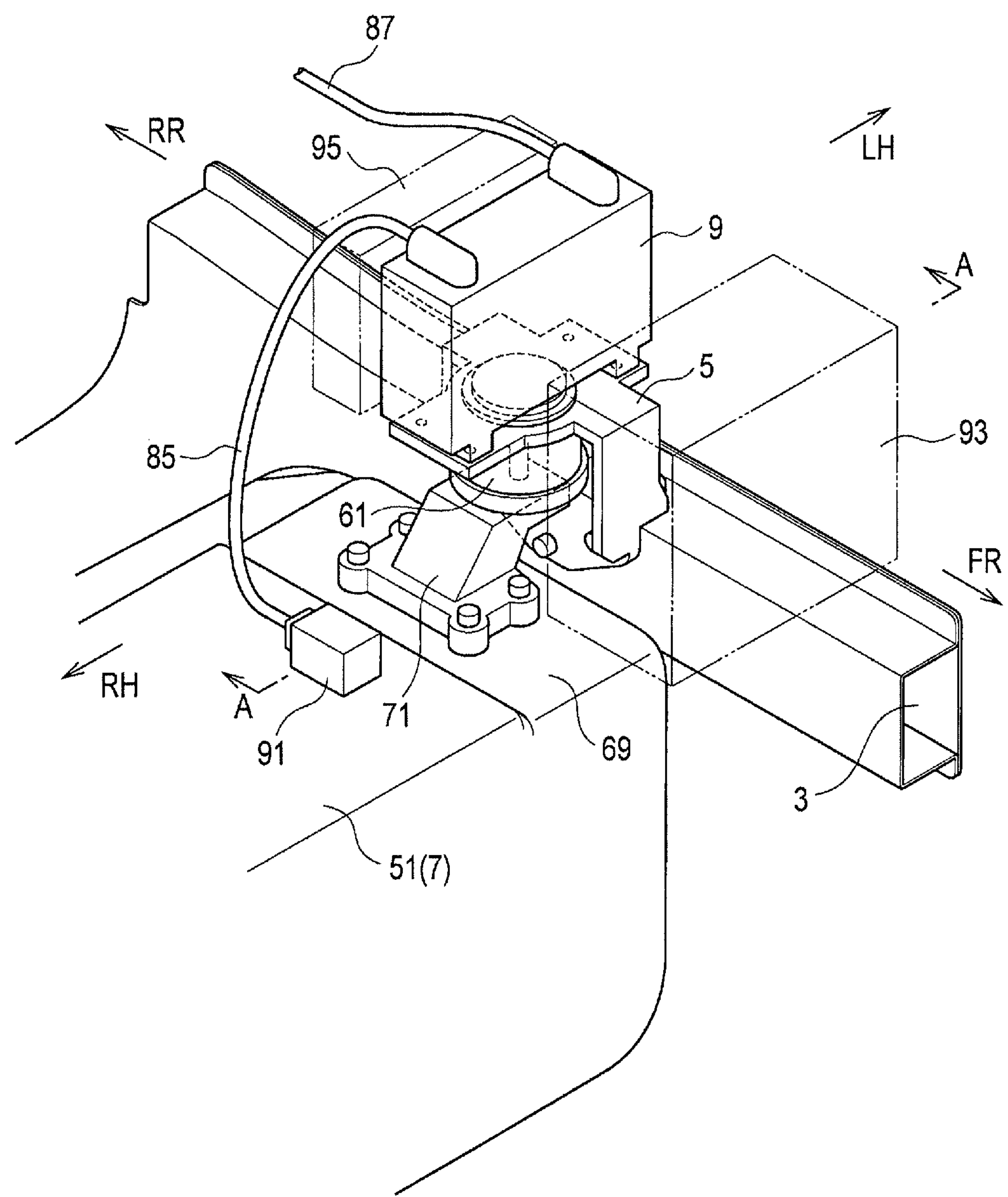
FIG. 4 is an enlarged perspective view illustrating a portion around the power conversion device according to the embodiment of the present invention.
Figure 5:
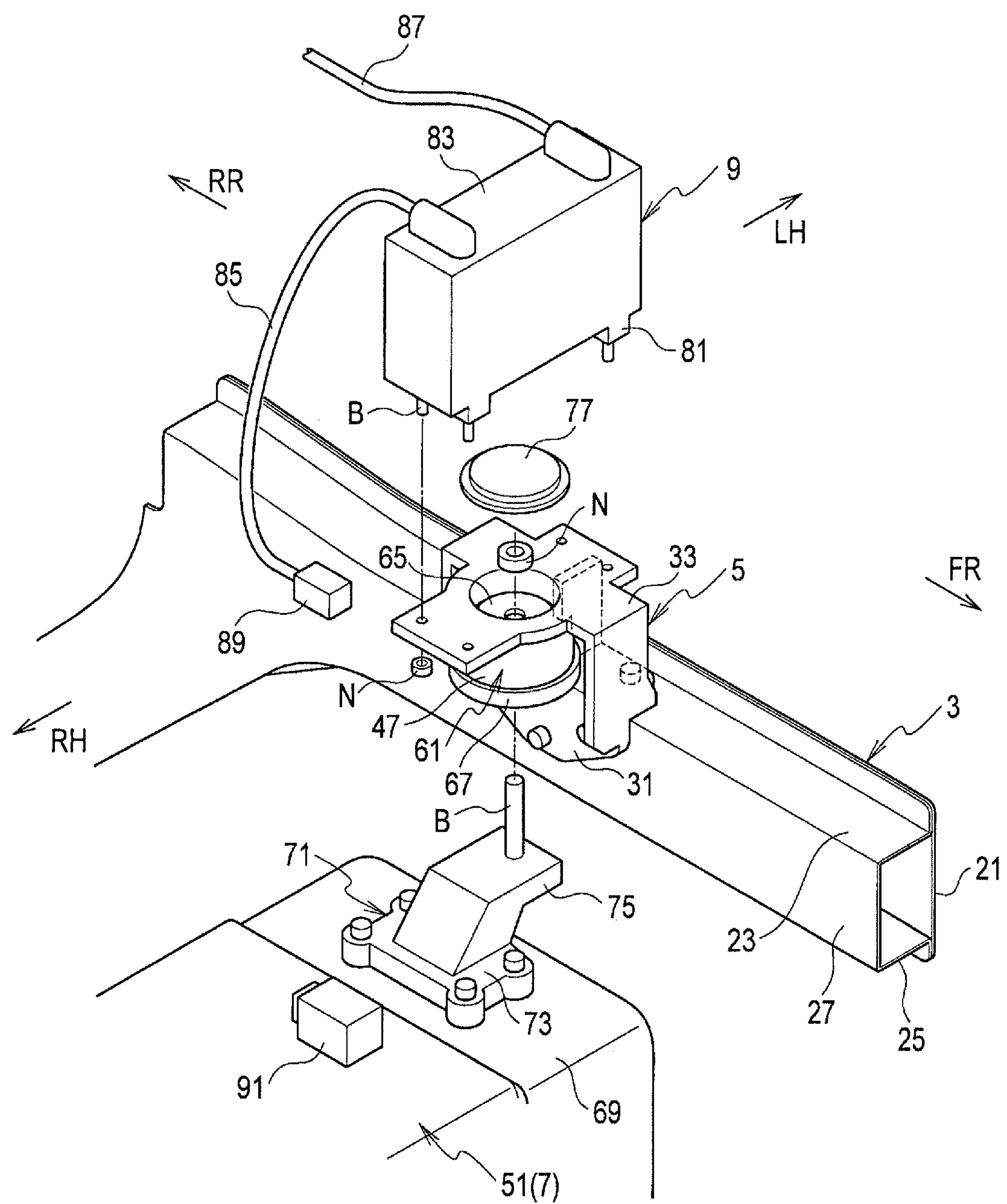
FIG. 5 is an exploded perspective view of FIG. 4.

Moreover, as illustrated in FIGS. 1, 3, and 4, a low-voltage battery 93 (vehicle component) is arranged in front of the inverter 9 to face the inverter 9, and an air cleaner 95 (vehicle component) is arranged behind the inverter 9 to face the inverter 9. A back surface **93*a* which is a surface of the low-voltage battery 93 facing the inverter 9 and a front surface 95*a* which is a surface of the air cleaner 95 facing the inverter 9 are both formed in planar shapes. Note that, in the low-voltage battery 93, at least the back surface 93*a* which is the surface facing the inverter 9 is made of resin. Moreover, in the air cleaner 95, at least the front surface 95*a* which is the surface facing the inverter 9** is made of resin.

Operations and effects of the embodiment of the present invention are described below.

(1) The mounting structure for the power conversion device according to the embodiment of the present invention includes the side member 3 extending in the front-rear direction of the vehicle, the mounting component 5 provided on the side member 3, the drive unit 7 held by the side member 3 via the mounting component 5, and the inverter 9 (power conversion device) attached to the mounting component 5. The stiffness of the mounting component 5 is set greater than the stiffness of the side member 3 and the inverter 9 is arranged between the front end **7*a* and the rear end 7*b* of the drive unit 7** as viewed from the side of the vehicle.

As described above, the drive unit 7 and the inverter 9 are both attached to the side member 3 via the mounting component 5 which has greater stiffness than the side member 3. Moreover, the inverter 9 arranged between the front end 7*a* and the rear end 7*b* of the drive unit 7 as viewed from the side of the vehicle. In other words, the inverter 9 is arranged in a portion protected from a collision object by the drive unit 7. Moreover, since the stiffness of the mounting component 5 is set greater than the stiffness of the side member 3, the mounting component 5 is less likely to be crushed by impact load. Accordingly, when impact load toward the rear side is inputted into the vehicle, the front end 7*a* of the drive unit 7 receives the load and load inputted into the inverter 9 is thus reduced. Moreover, when the load toward the rear side is inputted into the drive unit 7, the inverter 9 moves rearward together with the drive unit 7. In frontal collision of the vehicle, since the drive unit 7 and the inverter 9 move rearward without rotating as described above, the impact load inputted into the inverter 9 can be reduced.

(2) The side member 3, the mounting component 5, and the outer surface of the inverter 9 are made of metal, the side member 3 and the mounting component 5 are in contact with each other, and the mounting component 5 and the outer surface of the inverter 9 are in contact with each other.

Accordingly, the potentials of the side member 3, the mounting component 5, and the outer surface of the inverter 9 are set to be the same (equipotential). Accordingly, the inverter 9 can be efficiently earthed (grounded) in a simple structure without using a ground wire.

(3) The mounting component 5 includes the vibration damper 61 supporting the drive unit 7.

Since the drive unit 7 is attached to the vibration damper 61 as described above, 9 the vibration of the drive unit 7 generated when the vehicle travels can be prevented from being transmitted to the vehicle body.

(4) The drive unit 7 includes the electric motor 51 and the electric motor 51 and the inverter 9 are electrically connected to each other via the first wire 85 (wire).

When impact load toward the rear side is inputted into the vehicle, the inverter 9 moves to the vehicle rear side together with the drive unit 7. Specifically, since the positions of the drive unit 7 and the inverter 9 relative to each other hardly change, the amount of change in the length of the first wire 85 is reduced and the load applied to the first wire 85 is reduced.

(5) The low-voltage battery 93 (vehicle component) or the air cleaner 95 (vehicle component) having a surface which faces the inverter 9 and which is formed in the planar shape is arranged on the vehicle front side or the vehicle rear side of the inverter 9 on the upper surface 23 of the side member 3.

Since the surface of the vehicle component facing the inverter 9 has the planar shape as described above, when the inverter 9 hits the vehicle component, the inverter 9 comes into contact with the vehicle component in a large area. Particularly, when the vehicle component is arranged on the vehicle front side of the inverter 9, the vehicle component can effectively absorb the impact load toward the vehicle rear side. The load inputted into the inverter 9 can be thereby further reduced.

(6) The vehicle component is the low-voltage battery 93 (battery) and, in the low-voltage battery 93, at least the back surface 93*a* which is the surface facing the inverter 9 is made of resin.

Since the vehicle component is the low-voltage battery 93, a space for maintenance work and replacement work of the low-voltage battery 93 can be also used as a space for maintenance work and preplacement work of the inverter 9 (power conversion device). Accordingly, the maintenance work and the replacement work of the inverter 9 and the low-voltage battery 93 are facilitated and, at the same time, the space around the inverter 9 and the low-voltage battery 93 can be set smaller. Moreover, since the surface of the low-voltage battery 93 facing the inverter 9 is made of soft resin, the impact load inputted into the inverter 9 in the case where the inverter 9 hits the low-voltage battery 93 can be further reduced.

Note that the present invention is not limited to the aforementioned embodiment and various modifications and changes can be made. For example, a thermal insulator may be provided in the mounting component 5. The thermal insulator can suppress transmission of heat from the engine 49 to the inverter 9. Moreover, although the low-voltage battery 93 is arranged in front of the inverter 9, the low-voltage battery 93 may be arranged behind the inverter 9.

REFERENCE SIGNS LIST

3 side member
5 mounting component
7 drive unit
7*a* front end
7*b* rear end
9 inverter
51 electric motor
61 vibration damper
85 first wire (wire)
93 low-voltage battery (vehicle component)
93*a* back surface (facing surface)
95 air cleaner (vehicle component)
95*a* front surface (facing surface)

The invention claimed is:

1. A mounting structure for a power conversion device comprising:

a vehicle body component extending in a front-rear direction of a vehicle;

a mounting component provided on the vehicle body component;

a drive unit held by the vehicle body component via the mounting component; and a power conversion device attached to the mounting component, wherein a stiffness of the mounting component is greater than a stiffness of the vehicle body component, the power conversion device is arranged between a front end and a rear end of the drive unit in a side view of the vehicle, and a front end of the power conversion device is arranged at a more rear side of the vehicle than a front end of the mounting component.

2. The mounting structure for a power conversion device according to claim 1, wherein the vehicle body component, the mounting component, and an outer surface of the power conversion device are made of metal, and the vehicle body component and the mounting component are in contact with each other, and the mounting component and the outer surface of the power conversion device are in contact with each other.

3. The mounting structure for a power conversion device according to claim 1, wherein the mounting component includes a vibration damper supporting the drive unit.

4. The mounting structure for a power conversion device according to claim 3, wherein the vibration damper comprises:

a rubber piece housing provided in the mounting component;

an upper rubber piece housed inside the rubber piece housing;

a metal holding plate arranged on the upper rubber piece; and a lower rubber piece arranged below a bottom surface of the rubber piece housing.

5. The mounting structure for a power conversion device according to claim 4, wherein the rubber piece housing comprises:

a disc-shaped bottom surface; and a cylindrical side surface extending upward from an outer peripheral edge of the bottom surface.

6. The mounting structure for a power conversion device according to claim 5, wherein the upper rubber piece, the metal holding plate, the bottom surface of the rubber piece housing, and the lower rubber piece are formed in disc shapes and an insertion hole for inserting a bolt is formed in a radial center of each of the upper rubber piece, the metal holding plate, the bottom surface of the rubber piece housing, and the lower rubber piece.

7. The mounting structure for a power conversion device according to claim 1, wherein the drive unit includes an electric motor, and the electric motor and the power conversion device are electrically connected to each other via a wire.

8. The mounting structure for a power conversion device according to claim 1, wherein the mounting component is supported by the vehicle body component.

9. The mounting structure for a power conversion device according to claim 1, wherein the mounting component comprises a lower bracket arranged in a lower portion and an upper bracket arranged in an upper portion, the lower bracket includes a vertical wall extending in the front-rear direction and an up-down direction of the vehicle and an upper wall bent from an upper end of the vertical wall and extending outward in a vehicle width direction of the vehicle, the vertical wall and the upper wall being formed integrally with each other, and the mounting component is fixed to the vehicle body component with the upper wall of the lower bracket placed on an upper surface of the vehicle body component and with the vertical wall of the lower bracket in contact with an inner surface of the vehicle body component.

10. The mounting structure for a power conversion device according to claim 9, wherein the upper bracket includes three supporting legs extending upward from the upper wall of the lower bracket and an upper surface portion arranged on the supporting legs, the supporting legs and the upper surface portion being integral with one another.

11. The mounting structure for a power conversion device according to claim 10, wherein the upper surface portion of the upper bracket is provided with an outer extended portion formed in an end on a left side of the vehicle and an inner extended portion formed in an end on a right side of the vehicle, bolt holes are formed in the outer extended portion and the inner extended portion, and a cylindrical rubber piece housing is provided in a center of the upper surface portion to protrude downward.

12. A mounting structure for a power conversion device comprising:

a vehicle body component extending in a front-rear direction of a vehicle;

a mounting component provided on the vehicle body component;

a drive unit held by the vehicle body component via the mounting component; and a power conversion device attached to the mounting component, wherein a stiffness of the mounting component is greater than a stiffness of the vehicle body component, the power conversion device is arranged between a front end and a rear end of the drive unit in a side view of the vehicle, and a front end of the power conversion device is arranged at a more rear side of the vehicle than a front end of the mounting component, and a vehicle component with a surface facing the power conversion device and formed in a planar shape is arranged on a vehicle front side or a vehicle rear side of the power conversion device on an upper surface of the vehicle body component.

13. The mounting structure for a power conversion device according to claim 12, wherein the vehicle component is a battery and at least a surface of the battery facing the power conversion device is made of resin.

* * * * *